(12) United States Patent
Klappert et al.

(10) Patent No.: US 10,449,732 B2
(45) Date of Patent: Oct. 22, 2019

(54) CUSTOMIZED THREE DIMENSIONAL (3D) PRINTING OF MEDIA-RELATED OBJECTS

(71) Applicant: Rovi Guides, Inc., Santa Clara, CA (US)

(72) Inventors: Walter R. Klappert, Los Angeles, CA (US); Michael R. Nichols, Cambridge, MA (US); Jason Lam, Torrance, CA (US)

(73) Assignee: Rovi Guides, Inc., San Jose, CA (US)

( * ) Notice: Subject to any disclaimer, the term of this patent is extended or adjusted under 35 U.S.C. 154(b) by 936 days.

(21) Appl. No.: 14/586,640

(22) Filed: Dec. 30, 2014

(65) Prior Publication Data

US 2016/0185043 A1 Jun. 30, 2016

(51) Int. Cl.
| | |
|---|---|
| *B33Y 10/00* | (2015.01) |
| *B29C 67/00* | (2017.01) |
| *B29C 64/386* | (2017.01) |
| *B33Y 30/00* | (2015.01) |
| *B33Y 50/02* | (2015.01) |

(52) U.S. Cl.
CPC ........ *B29C 67/0088* (2013.01); *B29C 64/386* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,243,334 B2 | 8/2012 | Abeloe | |
| 2009/0303507 A1* | 12/2009 | Abeloe | B29C 67/0088 358/1.9 |
| 2013/0162643 A1* | 6/2013 | Cardle | G06T 17/00 345/420 |
| 2013/0290220 A1* | 10/2013 | Tschanz | G05B 19/4097 705/400 |
| 2014/0079297 A1* | 3/2014 | Tadayon | G06K 9/00 382/118 |
| 2014/0088750 A1* | 3/2014 | Sharma | G05B 19/4099 700/118 |
| 2015/0035198 A1* | 2/2015 | Saba | B33Y 10/00 264/211.12 |
| 2015/0145171 A1* | 5/2015 | Walker | B33Y 10/00 264/401 |

FOREIGN PATENT DOCUMENTS

CN 103754056 A 4/2014

OTHER PUBLICATIONS

U.S. Appl. No. 14/133,125, filed Dec. 18, 2013, Klappert et al.

* cited by examiner

*Primary Examiner* — Matthew J Daniels
*Assistant Examiner* — Mohammad M Ameen
(74) *Attorney, Agent, or Firm* — Haley Guiliano LLP

(57) ABSTRACT

In some aspects, control circuitry may receive a selection of a foreground object presented in a video scene being viewed by the user. Based on the selection of the foreground object, control circuitry may ascertain a background object from the video scene. By ascertaining an object, control circuitry may be able to identify an object, and prepare for modification a design file for the 3D printing of that object. Control circuitry may determine an attribute of the foreground object. Based on the determined foreground object attribute, control circuitry may modify a parameter of a design file for printing a 3D printing of the background object.

9 Claims, 5 Drawing Sheets

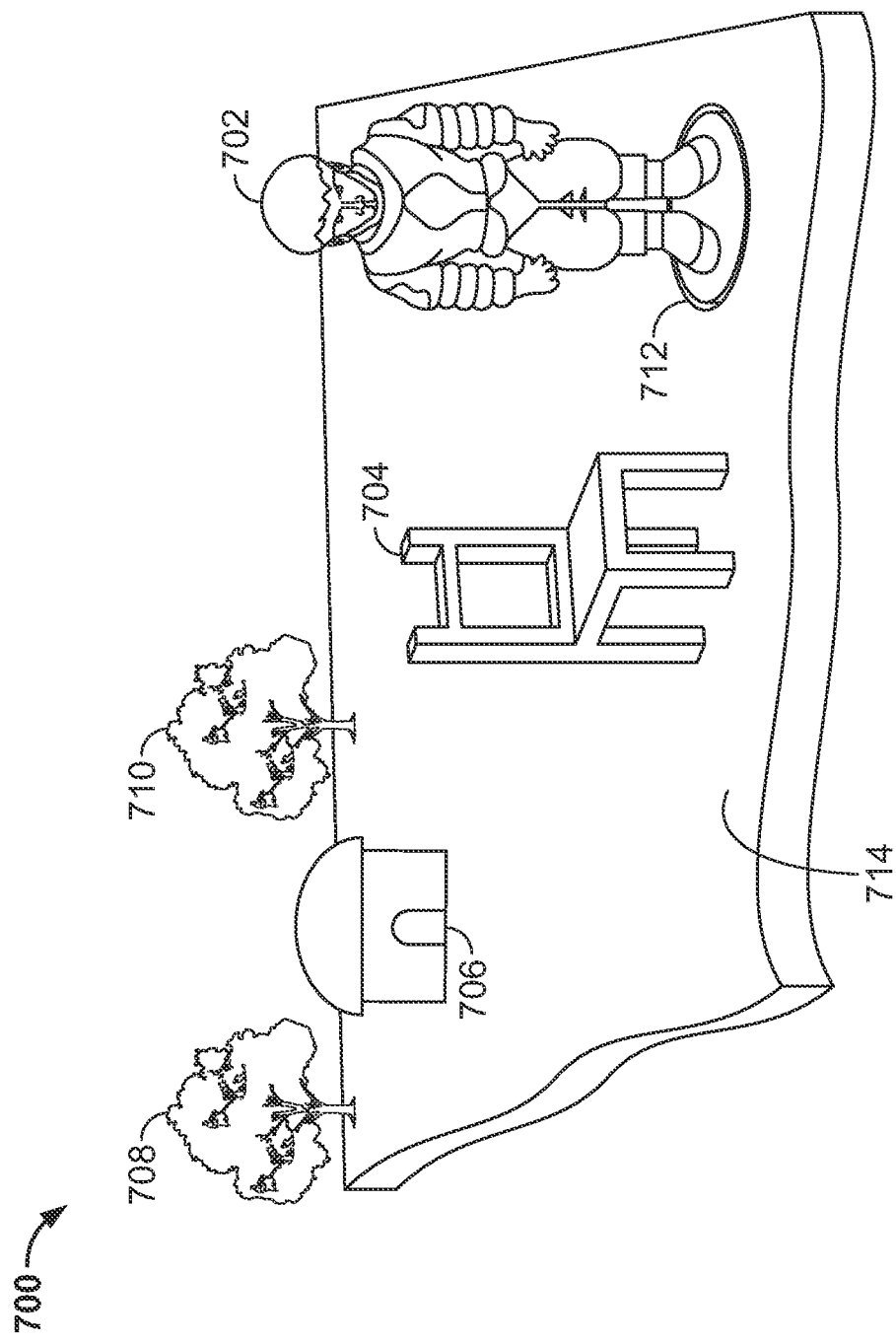

CUSTOMIZED THREE DIMENSIONAL (3D) PRINTING OF MEDIA-RELATED OBJECTS

BACKGROUND

Three-dimensional (3D) printing has gained popularity in recent years and is becoming increasingly accessible to the average consumer. As 3D printing continues to develop, it is raising the accessibility of users using 3D printing to print 3D representations of objects found in media assets that are viewed by users on TVs, smartphones, and the like. Current 3D printers are cumbersome to use for this purpose because a consumer must take the time and effort involved in not only selecting each object for printing, but also for understanding the dimension, position, and distance relationships between multiple objects.

SUMMARY

Methods and systems are provided herein for enabling 3D printing of background objects presented within a media frame. As an example, based on the selection of an object in the foreground of a video scene, control circuitry may modify the sizes and distances of background objects found in the media frame such that there are no drastic size differences between objects. Control circuitry may also modify sizes of the background objects based on printing size constraints of a 3D printer. Control circuitry may prepare a background object for printing by modifying parameters of the design file for the 3D printing of the background object in order to decrease the time required for printing the background object. For example, control circuitry may modify a focus parameter to minimize the amount of complexity in the object, which may allow for a shorter print time. In other aspects, control circuitry may combine parameters from multiple design files for the 3D printing of background objects into one design file. Control circuitry may additionally or alternatively incorporate parameters from multiple design files for the 3D printing of an object to a singular design file for the printing of a base board, which can then support the placement of a printed foreground object.

In some aspects, control circuitry may receive a selection of a foreground object presented in a video scene being viewed by the user. Methods for selecting an object in a media asset are described in greater detail in Klappert et al. U.S. patent application Ser. No. 14/133,125, which is hereby incorporated by reference herein in its entirety. For example, a user may use a touchscreen interface to touch and select an animated movie character standing in the foreground of a movie scene. Based on the selection of the foreground object, control circuitry may ascertain a background object from the video scene. By ascertaining an object, control circuitry may be able to identify an object, and prepare for modification a design file for the 3D printing of that object. For example, to ascertain a tree object in a media frame, control circuitry may analyze position data of the tree object contained in metadata associated with the media frame in order to determine that a tree object is present in the media frame. Control circuitry may then retrieve the design file of the tree object by requesting Computer-Generated Imagery (CGI) data corresponding to the tree object from a database.

Control circuitry may determine an attribute of the foreground object, such as the height or length of an animated movie character in a movie scene. Based on the determined foreground object attribute, control circuitry may modify a parameter of a design file for printing a 3D printing of the background object. For example, if control circuitry determines that the height parameter of the design file of a selected foreground object (e.g., an animated movie character) is eight units, and the height of the background object (e.g., a tree) is eighty units, then control circuitry may modify the height parameter of the design file for the 3D printing of the tree object to twelve units, which is a value that is more similar to the height of the animated movie character. As a result, the proportions between the foreground object and the background objects are adjusted, so that when control circuitry scales the parameters of the design files for 3D printing of each object in order to allow the printed objects to satisfy the printer's physical dimension constraints, both objects are printed in similar sizes. The physical dimension constraints measure the maximum dimensions of an object that can be printed.

In some embodiments, control circuitry may determine that a parameter of the design file for the 3D printing of the background object, such as a height parameter, exceeds a physical dimension constraint of a 3D printer. For example, control circuitry may transmit a request to a 3D printer, and receive a response with a model number of the 3D printer. Control circuitry may then cross-reference the received model number with physical dimension constraints of the 3D printer by transmitting the model number to a database containing a cross-reference table. Control circuitry may then receive the cross-referenced physical dimension constraints. Control circuitry may then modify the parameters of the design file for the 3D printing of the object so that the object can be printed without cropping. For example, control circuitry may determine that when an object is printed using the design file for the 3D printing of that object, twenty percent of the object may not be printed as the object is taller than what a 3D printer is able to print. Control circuitry may then reduce the value of every parameter defining a size dimension in the design file for the 3D printing of the background object by twenty percent in order to ensure that the printed object is shorter or equal to eight inches.

In some embodiments, control circuitry may determine that an expected print time associated with the printing of the background object exceeds a certain threshold. The expected print time indicates the amount of time a given object may need for printing. Control circuitry may determine the expected print time by calculating the size of the design file of the background object, and then cross-referencing the size of the design file with an expected print time in a look-up table stored in a database. A threshold may be set by analyzing the user profile print history and determining that the user regularly sets thresholds of two minutes when printing objects. Control circuitry may determine that the expected print time exceeds the set threshold and may take measures to ensure the print time is below the set threshold.

In some embodiments, for example, the remedial measures control circuitry may take include modifying a focus parameter of the design file for the 3D printing of the background object. For example, circuitry may reduce the level of complexity of a 3D printed reprinted representation of the design file for the printing of the background object. The focus parameter may control the number of details visible in the printed representation of the object. For example, in order to decrease an expected print time from twenty minutes to two minutes, control circuitry may modify a focus parameter of the design file for the 3D printing of the tree object in such a way that elements of the printed representation of the tree object, such as branches and leaves, become out of focus and therefore, less prominent and less complex. In other embodiments, control circuitry may modify a resolution parameter to reduce the number of printer head movements required to print a given detail, which may result in a decreased expected print time. For example, in order to decrease an expected print time from twenty minutes to two minutes, control circuitry may modify a resolution parameter of a design file for a tree object in such a way that a large percentage of detail is removed from the printed representation of the tree object, thus significantly reducing the expected print time.

In some embodiments, control circuitry may determine an attribute of a second background object and, based on the determined attribute, control circuitry may then modify a parameter of the design file of the initially selected background object. For example, in response to a selection of a background object (e.g., a tree), the height attribute of which is initially set to eighty units, control circuitry may determine a height attribute of a second background object (e.g., house), which may be set to twenty units. Based on the height attribute of the second background object (e.g., house), control circuitry may modify the height parameter of the first background object (e.g., a tree) from eighty to thirty units. As a result, the proportions between the foreground object and the background objects are adjusted, so that when control circuitry scales the parameters of the design files for 3D printing of each object in order to allow the printed objects to satisfy the printer's physical constraints, both the house object and the tree object are printed in a similar size.

In some embodiments, control circuitry may source a design file for the 3D printing of the background object from CGI data associated with a media frame (e.g., a frame captured from a movie scene). For example, when control circuitry receives a selection of a background object from a movie scene, control circuitry may retrieve a design file from a database that stores CGI design files used to render the objects present in the movie scene. For example, control circuitry may learn from the CGI data the design file for the 3D printing of a house object. Control circuitry may then use the design file to print a representation of the house object.

In some embodiments, when CGI or similar data is unavailable for objects found in a particular media frame, control circuitry may analyze media frames sourced from multiple cameras to create a design file for the 3D printing of the background object. For example, upon receiving a selection of a background object, control circuitry may transmit a request to a database for additional media frames captured by the multiple cameras at the same instance the frame including the background object was captured by one of the cameras. Control circuitry may consider each additional media frame to determine relative positioning and size of each object of the frames (e.g., by triangulating each object), and may then create a design file for the 3D printing of the background object by combining data from the user-selected media frame and the considerations of the additional media frames.

In some embodiments, control circuitry may analyze parameters of design files for the 3D printing of a background object of a media frame in combination with parameters of design files of other background objects that are present in the same media frame in order to determine how parameters of the different background objects may interact. For example, control circuitry may receive a selection of a tree in a media frame, in which case the parameters of the design file for the 3D printing of a 3D representation of the tree, and the parameters of the design file for the 3D printing of a 3D representation of a house may be analyzed. Control circuitry may analyze the parameters of the two design files for the 3D printing of the background objects concurrently. For example, if the two objects in the movie scene are touching, control circuitry may determine how the parameters of the design file for the 3D printing of the first object (e.g., tree) interact with the parameters of the design file for the 3D printing of the second object (e.g., house), so that parameters from both design files may be combined into one design file. In another example, if one object appears behind another object in a media scene, control circuitry may analyze the parameters of the design files for the 3D printing of each object concurrently and determine how the parameters of the design file of the first object may be combined with the parameters of the design of the second object in order to combine the parameters of the design files of both objects into one design file. As a result, both objects may be printed as a single object. In another example, by analyzing the parameters of design files of multiple objects concurrently, control circuitry may rely on the analyzed parameters in generating one singular design file for the 3D printing of a base board that incorporates parameters from each analyzed design file.

As described above, a design file for a base board may be used for the printing of a 3D representation of background objects of a media frame within a single object characterized by a number of flat surfaces. As an example, such a base board may be useful in recreating, for example, a media frame depicting landscape scenery (e.g., single flat surface), or a media frame depicting a room interior (e.g., multiple flat surfaces for generating the floor and a number of walls). In order to generate a design file for the base board example, control circuitry may combine parameters from design files associated with each of two different objects (e.g., two different trees within a media frame), such that the design file, when relied upon to print a 3D representation, causes a base board to include the characteristics of each tree embedded within the base board.

In some embodiments, control circuitry may harmonize a design file for the 3D printing of the base board with a design file of a foreground object of the media frame used to generate the base board, such that the foreground object can be seamlessly coupled to the base board. A seamless coupling between the foreground and base board objects may be achieved by creating a temporary and repeatable bond between a printed foreground object and a printed base board object using an indentation component present in a printed foreground object that may tightly couple with a protrusion component present on a printed background object. For example, control circuitry may analyze the parameters of the design file for the 3D printing of the foreground object that describes the base of the foreground object (e.g., an animated movie character) in order to determine the shape of the surface area covered by a printed shoe component of a printed animated movie character object, if the printed shoes were to be placed on a flat surface. Control circuitry may then modify the design file of the base board object to include two indentations, and may base the modification of the design file of the base board object on the analysis of the surface area covered by the shoes as determined from a design file of the foreground object, such that each indentation of a printed base board object may be seamlessly coupled to a corresponding shoe of a printed foreground object.

In some embodiments, control circuitry may transmit a request to a remote database to receive the parameters associated with the design file for the 3D printing of the foreground object. Control circuitry may receive these parameters from a remote database. Control circuitry may then identify at least one of a size parameter and a position parameter. For example, when control circuitry receives a selection of a foreground object (e.g., an animated movie character), the control circuitry transmits a request to receive the parameters of design file for the 3D printing of an animated movie character to a database. When control circuitry receives the parameters from the database, control circuitry may identify a height parameter of the design file for the 3D printing of the animated movie character and an x-coordinate parameter of the placement of the object in the media frame. The control circuitry may then use the determined parameters to compare the size and position of the foreground object to the size and position of a background object. The parameters of both objects may then be scaled and modified in such a way that when both objects are printed, the objects are printed in a similar size, which may avoid situations where a printed 3D representation of a foreground object is disproportionately larger than a printed 3D representation of a background object, or vice versa.

In some embodiments, control circuitry may receive a user request to modify a parameter for the design file for the 3D printing of the background object using a user input interface. Control circuitry may then modify the design file in such a way that the printed background object reflects the user input corresponding to the user-modified parameter. For example, control circuitry may receive user input to modify a width parameter of the design file for the 3D printing of a tree object, by decreasing the width from four units to two units. As a result, the proportions between the foreground object and the background objects are adjusted, so that when control circuitry scales the parameters of the design files for 3D printing of each object in order to allow the printed objects to satisfy the printer's physical constraints, both objects are printed at a similar size.

In some embodiments, control circuitry may receive a user input indicating the selection of a media frame. For example, when an animated video is viewed by a user, control circuitry may receive a user input indicating selection of a specific video scene in which an animated movie character is standing in the foreground, with a house in the background. Control circuitry may then receive a user input to advance the scene by five frames, as the user has determined that in the fifth video frame, the animated movie character strikes a characteristic pose made famous in a latest blockbuster.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 shows an illustrative embodiment of a 3D printed base board object with printed three-dimensional representations of objects resting on the base board in accordance with some embodiments of the disclosure.

DETAILED DESCRIPTION

Figure 1:
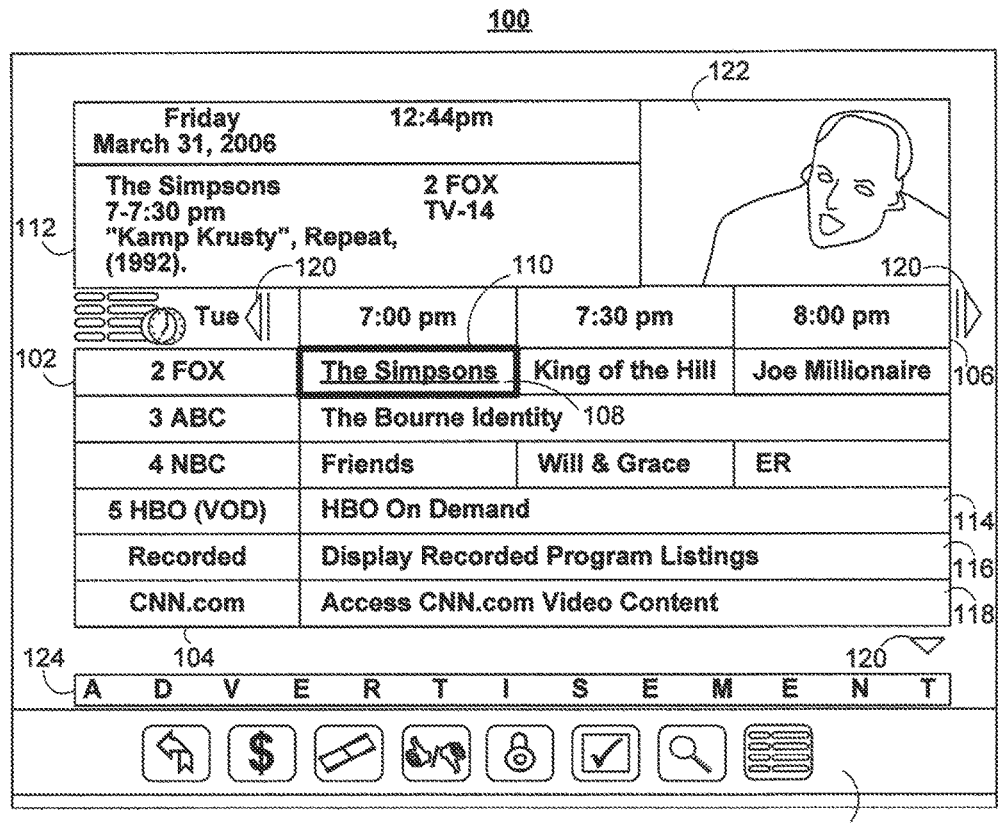
FIG. 1 shows an illustrative embodiment of a display screen that may be used to provide media guidance application listings and other media guidance information, in accordance with some embodiments of the disclosure.

Methods and systems are provided herein for enabling 3D printing of background objects presented within a media frame. As an example, based on the selection of an object in the foreground of a video scene, control circuitry may modify the sizes and distances of background objects found in the media frame such that there are no drastic size differences between objects. Control circuitry may also modify sizes of the background objects based on printing size constraints of a 3D printer. Control circuitry may prepare a background object for printing by modifying parameters of the design file for the 3D printing of the background object in order to decrease the time required for printing the background object. For example, control circuitry may modify a focus parameter to minimize the amount of complexity in the object, which may allow for a shorter print time. In other aspects, control circuitry may combine parameters from multiple design files for the 3D printing of background objects into one design file. Control circuitry may additionally or alternatively incorporate parameters from multiple design files for the 3D printing of an object to a singular design file for the printing of a base board, which can then support the placement of a printed foreground object.

The term "object," wherever used in this disclosure, refers to any discrete item present in a media frame. Any individually recognizable item or set of associated items is within the scope of the definition of "object." For example, if an animated movie character is depicted sitting on a horse, the animated movie character and the horse may be referred to, collectively, as an object. If a three-dimensional representation of an object is printed using a three-dimensional printer, the object may be referred to as a "printed object."

The term "attribute," wherever used in this disclosure, refers to any measureable or observable characteristic of, or associated with, an object. For example, an attribute of an object may be a pigmentation of an object. As another example, an attribute of an object may be a parameter (see definition of "parameter" below) of a design file for printing a three-dimensional representation of the object.

The term "parameter," wherever used in this disclosure, refers to any data that defines an aspect of a three-dimensional representation of an object. For example, height, width, color, resolution, focus, and texture are all examples of parameters.

The term "foreground," wherever used in this disclosure, refers to an area of the media frame where objects that are closest to an observer appear. An object present in the foreground may be referred to as a "foreground object."

The term "background," wherever used in this disclosure, refers to an area of the media frame behind the foreground. For example, the area immediately behind an animated movie character that is emphasized in a media frame may be referred to as the "background." Likewise, the area on the horizon in the media frame may also be referred to as the "background." An object that appears in the background area may be referred to as a "background object."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
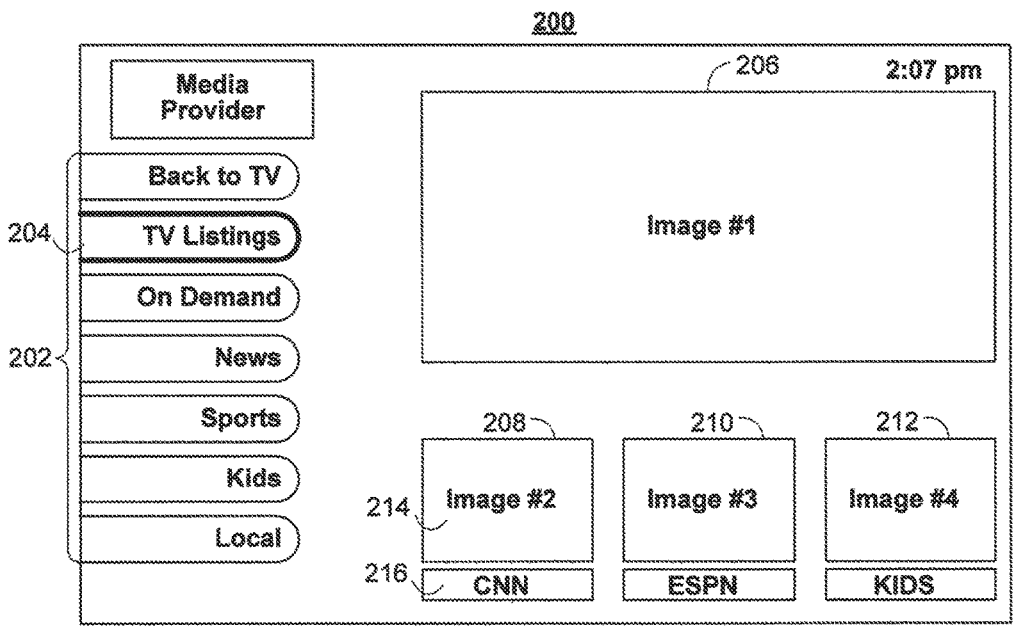
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
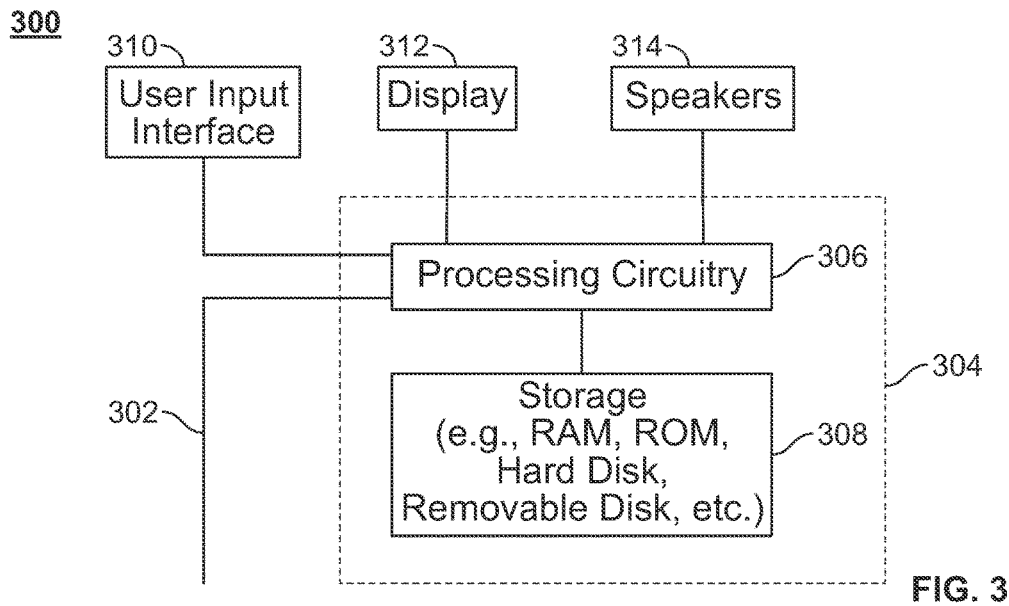
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
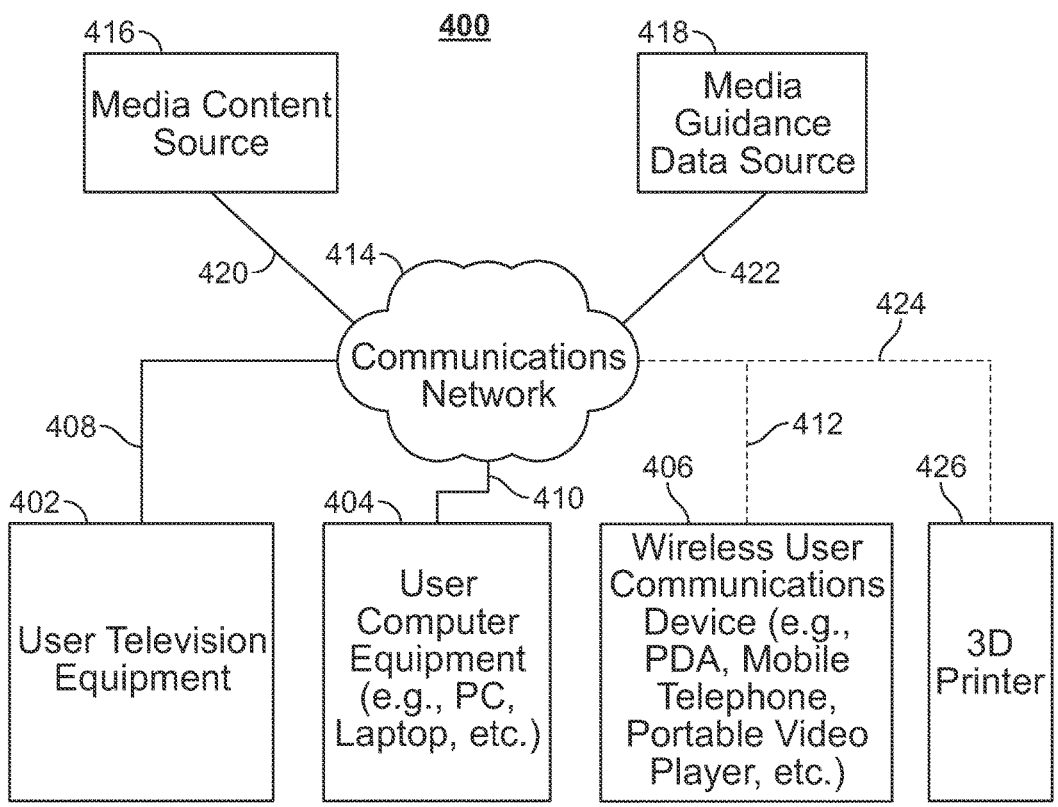
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, 3D printer 426, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Various methods and systems for utilizing 3D printers are discussed in, for example, Abeloe, U.S. Pat. No. 8,243,334, filed Jun. 5, 2009, Lai et al., U.S. Patent Publication No. 2008/0260918, filed Apr. 23, 2007, and Jandeska, Jr. et al., U.S. Pat. No. 7,141,207, filed Aug. 30, 2004, which are hereby incorporated by reference herein in their entireties.

A user equipment device utilizing at least some of the system features described above in connection with FIG. 3 may not be classified solely as user television equipment 402, user computer equipment 404, a wireless user communications device 406, or 3D printer 426. 3D printer 426 may be used to achieve the objects of the description above and below. User television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406, and 3D printer 426 are coupled to communications network 414 via communications paths 408, 410, 412, and 424, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, 412, and 424 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408, 410, and 424 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, 412, and 424 as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, 412 and 424. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, 406, and 426 are shown as through communications network 414, in some embodiments, sources 416 and 418 may communicate directly with user equipment devices 402, 404, 406, and 426 via communication paths (not shown) such as those described above in connection with paths 408, 410, 412, and 426.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry to generate the guidance application displays and transmit the generated displays to the user equipment devices. The server application may instruct control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, wireless user communications device 406, and 3D printer 426. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
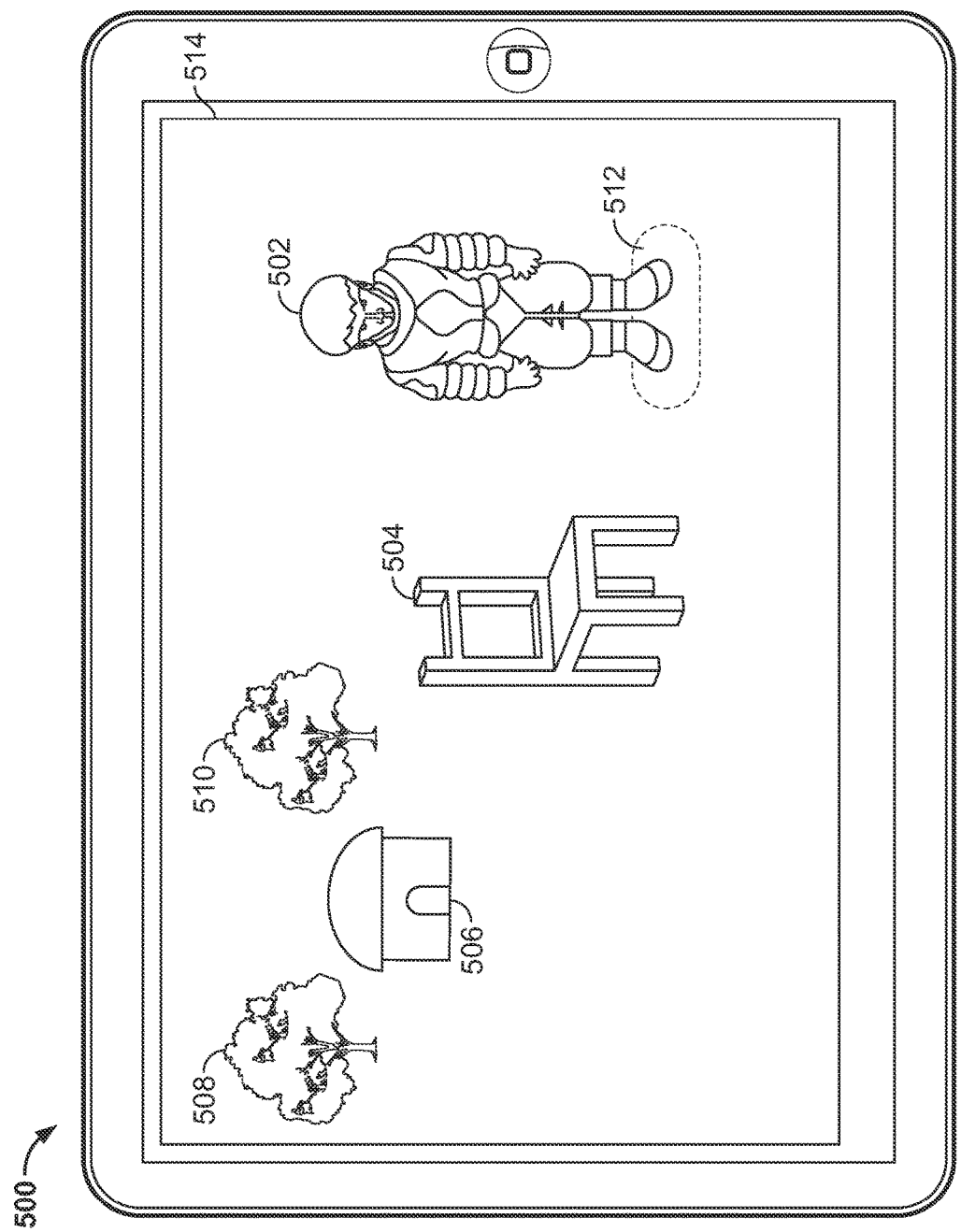
FIG. 5 shows an illustrative embodiment of a display screen that may be used for selection of an object for three-dimensional printing, in accordance with some embodiments of the disclosure.

FIG. 5 shows an illustrative embodiment of a display screen that may be used for selection of an object for three-dimensional printing, in accordance with some embodiments of the disclosure. User equipment 500 (e.g., a tablet device) depicts media frame 514, including objects 502, 504, 506, 508, and 510. Media frame 514 may be a still picture, or may be a frame of a video that is being viewed by a user. A video from which media frame 514 is derived may be, for example, broadcast television video, Internet video, on-demand video, or video from any other source. User equipment 500 is depicted as a tablet device (e.g., an iPad), but may be any user equipment device, including user television equipment 402, user computer equipment 404, or wireless user communications device 406. In some embodiments, control circuitry 304 may receive input from a user (e.g., via user input interface 310) to pause the playback of video in order to select a specific frame 514. Once the playback is paused, control circuitry may receive input from a user (e.g., via user input interface 310) to replace the frame at which playback was paused with either the next frame in the frame playback sequence, or the frame in the frame playback sequence that precedes the frame at which playback was paused. In some embodiments, control circuitry 304 may receive input from a user (e.g., via user input interface 310) to select an object of media frame 514 while the video is playing back, and without pausing the video. In some embodiments, media frame 514 does not originate from a video, and may comprise any content displayed by user equipment 500 (e.g., a web page, an application, a photograph, and the like).

Control circuitry 304 may generate for display media frame 514 on user equipment 500. Media frame 514 may include foreground object 502 in a foreground of media frame 514. Media frame 514 may also include chair object 504, house object 506, tree object 508 and tree object 510, which are depicted in a background of the media frame, but may be included in a foreground or background of the media frame. While objects 502 is depicted as a foreground object, and while objects 504, 506, 508, and 510 are depicted as background objects, this is for illustrative purposes only, and any of these objects may be foreground or background objects. Furthermore, fewer or more objects than are depicted in FIG. 5 may be present in media frame 514.

In some embodiments, control circuitry 304 may receive a selection of an object in the foreground of the media frame 514, for example, foreground object 502 (e.g., an animated movie character). Control circuitry 304 may receive a selection of a foreground object 502 automatically, or control circuitry 304 may receive this selection through user input. For example, in the case that user equipment 500 has the ability to receive touch screen input, control circuitry 304 may receive the selection by detecting that a user has touched the screen of user equipment 500 at a position where an object of media frame 514 is presented on the user equipment 500. For example, a user may touch user equipment 500 at a location where foreground object 502 is displayed in media frame 514. As another example, control circuitry 304 may automatically receive the selection of a foreground object 502 by analyzing metadata associated with media frame 514. Metadata may be a set of data that includes various data entries that control circuitry 304 may easily analyze to determine certain characteristics of media frame 514. For example, control circuitry 304 may retrieve metadata from media guidance data source 418, and the metadata may be associated with a specific media name and time stamp combination. A media frame 514 at a given point in the playback of a video may include a foreground object placed in a specific area of media frame 514 (e.g., foreground object 502 standing at the right side of media frame 514). In this example, media frame 514 may be associated with a specific time stamp (e.g., twenty minutes and thirty-one seconds from the start of video playback) and media name (such as a movie title like "Shrek"). Control circuitry 304 may acquire the media name information from media guidance source 418. Control circuitry 304 may send information naming the media and the determined time stamp (e.g., over communication network 414) to media guidance data source 418 to acquire metadata associated with media frame 514. For example, control circuitry 304 may determine that the retrieved metadata includes an entry for each object 502, 504, 506, 508, and 510 presented in media frame 514. Each such entry may identify the name of the object, attributes of the object such as height, length, width, distance from an axis, focus, whether the object is a foreground object or a background object, position parameters, volume and the like.

If control circuitry 304 identifies two objects in the metadata that are identified as foreground objects, control circuitry 304 may select an object that appears closer to the center of a horizontal axis as foreground object 502. The horizontal axis may be defined, for example, as an axis originating at the lower left corner of media frame 514, and terminating at the lower right corner of media frame 514. In effect, control circuitry 304 may use the position coordinates to determine which of the two foreground objects, as identified by the metadata, to select as foreground object 502. When control circuitry 304 receives a selection of an object (e.g., foreground object 502) present in media frame 514 from user input, and control circuitry 304 determines that metadata is not available for media frame 514, control circuitry 304 may delineate the object using an object recognition technique. For example, control circuitry 304 may receive a user input through a touchscreen interface of user equipment 500 (e.g., user input interface 312), and may convert the input into x and y coordinates of the selected object 502. Control circuitry 304 may analyze media frame 514 to detect edges present around the position defined by the specified x and y coordinates to determine the area comprising the area of the user-selected object 502 As a result, control circuitry 304 may perceive the delineated area as a foreground object 502.

In some embodiments, control circuitry 304 may ascertain a background object of media frame 514. For example, control circuitry 304 may ascertain the background object by identifying some or all background objects of media frame 514. For example, control circuitry 304 may identify some or all background objects by analyzing metadata associated with media frame 514, and may determine a list of objects that are identified in the metadata as background objects. In another example, control circuitry 304 may approximate an area of media frame 514 that each depiction of each object present in media frame 514 (e.g., objects 502, 504, 506, 508, and 510) occupies. In this case, control circuitry 304 may generate a grid overlaying media frame 514 in its entirety, and then approximate the area of each depiction of an object by determining the number of grid squares that overlap each depiction of an object. Control circuitry 304 may then generate a list of objects, each with a corresponding surface area approximation, and identify the object with the largest corresponding surface area as the foreground object 502, while identifying the remaining objects as background objects. After identifying a foreground object 502, control circuitry 304 may identify individual objects presented in each media frame by analyzing metadata associated with each media frame 514 as discussed above. Control circuitry 304 may then ascertain a particular background object of media frame 514.

For example, control circuitry 304 may ascertain a background object 504 based on the determining the object with the shortest calculated visual distance of some or all background objects from foreground object 502. Visual distance may be calculated as the distance between two points on media frame 514. Control circuitry 304 may ascertain background object 504 (e.g, chair) by determining that the visual distance between background object 504 and foreground object 502 is the shortest among the distances between foreground object 502 and some or all other background objects. Control circuitry 304 may also ascertain a background object by determining the largest, by volume, background object in media frame 514. For example, control circuitry 304 may use metadata retrieved from media guidance source 418, which may include a volume attribute for each background object. For example, of the background objects of media frame 514, control circuitry 304 may determine that house object 506 has the highest volume, as compared to tree object 508, tree object 510, and chair object 504, and may therefore ascertain house object 506 as the background object.

As a final example, control circuitry 304 may ascertain a background object based on a user profile, which control circuitry 304 may retrieve from a database (e.g., from storage 308 or from media guidance data source 418). Control circuitry 304 may ascertain a background object by determining which of the objects present in the media frame 514 is most relevant to a user based on the user's profile. The user profile may include, for example, any or all of 3D printing history, 3D printing preferences, demographic information, previously viewed media assets, and the like. Control circuitry 304 may cross-reference the entries of the user profile against, for example, keyword description attributes of the background objects present in media frame 514. Control circuitry 304 may then select the background object that matches the highest number of keywords of entries of the user profile. In this example, control circuitry 304 may determine that the user has previously printed furniture present in a media scene, and control circuitry 304 may responsively ascertain the background object as background object 504 (e.g., a chair), as opposed to background object 508 (e.g., a tree) because a chair most closely corresponds to the user profile entry.

In some embodiments, control circuitry 304 may determine an attribute of a foreground object. For example, control circuitry 304 may determine that the height attribute of the foreground object 502 is eight units. In another example, control circuitry 304 may determine the y coordinate of the position of the foreground object, where the y coordinate position reflects a determined distance of the foreground object from the bottom edge of the media frame 514. Control circuitry 304 may determine these attributes from metadata corresponding to media frame 514 (e.g., as retrieved from a database such as media guidance data source 418) for a given media frame 514. Control circuitry 304 may retrieve the metadata listing attributes using a combination of media name and time stamp to query for the relevant metadata, as described above.

In some embodiments, control circuitry 304 may modify a parameter of the design file for the 3D printing of a background object based on the determined attribute of the foreground object. For example, if control circuitry 304 determines that a height attribute of a selected foreground object 502 is eight units, and the height of the background object (e.g., tree 508) is eighty units, then control circuitry 304 may modify the height parameter of the tree to twelve units, which is a value that is more similar to the height of the foreground object 502. In doing so, control circuitry 304 may generate a design file that keeps each object of media frame 304 in similar proportion with respect to one another.

In some implementations, control circuitry 304 may determine an apparent distance attribute of the foreground object from metadata (e.g., CGI data) corresponding to media frame 514 (e.g., by retrieving metadata from media guidance data source 418 and consulting an indicated apparent distance attribute of the metadata). An apparent distance may indicate a distance between the foreground object 502 and a background object 506 (e.g., house) as defined in CGI data used to render the objects present in media frame 514. In the CGI data used to render a media frame, the apparent distance between a foreground object and a background object may be used to create an illusion of linear perspective when media frame 514 is rendered. In other words, a background object that is far away (e.g., twenty units) from a foreground object, in terms of apparent distance, may be rendered by control circuitry 304 to appear smaller in size than a background object that is closer (e.g., two units), which may be rendered to appear bigger. The apparent distance between objects may be derived from CGI data and may then be stored in the metadata associated with media frame 514. Control circuitry 304, after determining an apparent distance attribute of the foreground object 502 from metadata, may modify a parameter of the design file for the 3D printing of background object 506. For example, control circuitry 304 may determine that an apparent distance attribute of foreground object 502, specifying the apparent distance from a foreground object 502 to background object 506 (e.g. house), may be twenty units. Control circuitry 304 may then modify a height parameter of the design file for the 3D printing of background object 506 so that when the foreground object 502 and background object 506 are printed, the height of the printed representation of background object 504 is similar to the height of the foreground object 502. This may allow both objects to be printed in similar proportions without drastic differences in height.

In some embodiments, control circuitry 304 may modify a parameter of the design file for the 3D printing of a background object based on determining a physical dimension constraint of a build volume of 3D printer 426. The physical dimension constraints of a 3D printer build volume 426 may, for example, represent a printer's capability with respect to maximum dimensions of an object that a given printer is capable of printing. For example, a height physical dimension constraint of eight inches may indicate 3D printer 426 is not capable of printing objects that exceed a height of eight inches. To determine the physical dimension constraints of a build volume of 3D printer 426, control circuitry 304 may transmit a query to 3D printer 426 via communications network 414 and request a parameter describing 3D printer 426 (e.g., a printer model number). Control circuitry 304, in response to receiving the parameter, may transmit a query along with the parameter (e.g., model number) of 3D printer 426 requesting the physical dimension constraints of the build volume of printer 426 to a database, such as media guidance data source 418. Control circuitry 304 may then receive the physical dimension constraint of the build volume of 3D printer 426 using communications network 414 from media content source 416.

In a second example of determining a physical dimension constraint of a build volume of 3D printer 426, control circuitry 304 may receive a user input search symbol (e.g., via user input interface 310). The search symbol may be, for example, a text string or voice command. The user input may specify a model of 3D printer 426 that the user intends to use for printing an object (e.g., foreground object 502), or may specify a print service that the user intends to utilize for 3D printing of foreground object 502. Control circuitry 304, in response to receiving the printer model from the user input, may query media guidance data source 418 by sending a request for a physical dimension constraint of a printer corresponding to the search symbol (e.g., by using the determined printer model). Control circuitry 304 may then then receive the printer build volume constraints from the database (e.g., via communications network 414).

In some embodiments, control circuitry 304 may determine a maximum parameter value of the height of a background object 504 (e.g., chair) based on a determined physical dimension constraint, such that a background object (e.g., tree 506) is printed without cropping. For example, control circuitry 304 may determine that the physical dimension height constraint of 3D printer 426 is eight units. In such a case, the maximum parameter value of the object is modified to eight units.

In some embodiments, control circuitry 304 may compare the maximum parameter value of background object 506 to the current parameter value of that object. For example, control circuitry 304 may select a height parameter of a background object (e.g., tree 506) for modification. Control circuitry 304 may then determine the existing value of the height parameter to be eighty units, and compare the existing value of the height parameter to the maximum parameter value, which, for example, may be determined to be ten units.

In some embodiments, control circuitry 304 may modify the value of the existing parameter value of a background object based on the comparison of the maximum parameter value of the background object and the current parameter value of that object. For example, control circuitry 304 may select a height parameter of a background object (e.g., tree 506) for modification. Control circuitry 304 may then determine that the existing value of the height parameter is eighty units, and compare the existing value of the height parameter to the maximum parameter value, which, for example, may be determined to be eight units. Control circuitry 304 may then modify the existing value to a value that is less than or equal to the maximum parameter value. For example, control circuitry 304 may set the height of a background object to eight units, if control circuitry 304 determines that the current parameter value of the background object is more than eight units, for example, twenty units. As a result, in this example, an object printed by 3D printer 426 will be printed without any cropping in the vertical direction, which is determined by the height parameter.

In some embodiments, control circuitry 304 may determine a specified threshold associated with the printing of a background object. Control circuitry 304 may learn a threshold that specifies the maximum amount of time the 3D printing process may take. For example, control circuitry 304 may learn the threshold by receiving user input from user input interface 310 that specifies the maximum amount of time that the user is willing to wait for a 3D print to be completed. For example, control circuitry 304 may receive a user input that specifies that the user is willing to wait five minutes for a print to complete. As another example, control circuitry 304 may learn the threshold by analyzing the user profile. For example, control circuitry 304 may determine that the current user is Tommy. Control circuitry 304 may then determine that Tommy belongs to a child category of users, and that a two-minute threshold is associated with this category as children may not have the patience to wait through long printing times. As a final example, control circuitry 304 may learn the threshold by determining that the current user, Tommy, has a user profile history indicating that he often prints all of the objects present in media frame 514. As a result, control circuitry 304 may then set a relatively low threshold, such that some or all objects can be printed within a short period of time, and in effect Tommy does not need to wait a long time before he is able to play with objects from media frame 514.

In some embodiments, control circuitry 304 may determine an expected printing time using a look-up table. The expected printing time indicates how long the printing operation will take. For example, control circuitry 304 may calculate the file size of the design file of a background object, and retrieve a look-up table from media guidance source 416. A look-up table may associate a file size of design files with expected print times. Control circuitry 304 may then determine a file size entry in the look-up table that is closest to the calculated design file size of the background object, and retrieve the associated expected print time. As another example, control circuitry 304 may transmit a request to 3D printer 426 to simulate printing of the design file for the 3D printing of a background, and receive an expected print time from printer 426. For example, 3D printer 426 may include a simulation mode, which executes the 3D printer's printing code without actually printing the design file. The 3D printer 426 may be configured in such a way that, while in simulation mode, the printer may transmit an expected printing time to control circuitry 304 upon the termination of the printing code procedures. The printer may determine this based on the number of expected printer head movements, correlated with a look-up table that associates a given number of printer head movements with an expected printing time. The expected printing time may be affected by various parameters of the design file of an object.

In some embodiments, upon determining that the expected time required for printing of the background objects exceeds a specified threshold, control circuitry 304 may modify a parameter of the background object of the design file with the goal of reducing the expected time required for printing. It should be understood that control circuitry 304 may perform the modification of the parameters iteratively until control circuitry 304 determines that a satisfactory expected print time is achieved.

In one approach of reducing the expected print time, control circuitry 304 may modify a focus parameter of the design file such that the level of complexity of the background object is reduced. For example, if control circuitry 304 ascertains tree object 508 for printing, and determines that the time required for printing of tree object 508 exceeds a specified threshold, control circuitry 304 may modify the focus parameter. A focus parameter may specify an amount of defocus aberration in the object. For example, when tree object 508 is fully in focus, all branches and leaves of tree object 508 are present in a printed representation of tree object 508. The resultant complexity of tree object 508 may contribute to the length of the expected printing time. Control circuitry 304 may modify the focus parameter of the background object in such a way that when the object is printed by a 3D printer, simulated effects of defocus aberration are observed in the object. Defocus aberration effects are characterized by the reduction of sharpness and contrast. For example, decreasing the focus of tree object 508 may remove the details of not only all of the leaves present in tree object 508, but also all but the most prominent of branches in tree object 508. As a result, the number of details in the tree object is reduced, and the expected printing time may shorten.

In a second approach for reducing expected print time, control circuitry 304 may modify the resolution parameter of the design file such that the number of printer head movements is decreased. For example, if control circuitry 304 selects tree object 508, and determines that the time required for the printing of tree object 508 exceeds a specified threshold, control circuitry 304 may modify the resolution parameter. A resolution parameter may specify the amount of printer head movements permitted for printing an object. For example, when tree object 508 is printed at a high resolution, all branches and leaves of tree object 508 are present in the printed tree object 508. The resultant complexity of tree object 508 may contribute to the length of the expected printing time, as each detail requires a number of printer head movements. A printer head movement may be any printer operation required for printing a single element of an object. Control circuitry 304 may modify the resolution parameter of the design file for the 3D printing of the background object 508 in such a way that the number of printer head movements executed for each detail is limited. For example, decreasing the resolution of tree object 508 may result in a loss of leaf and branch details as the printer may not be allowed to execute enough printer head movements to print each detail. As a result, the number of details in the printed representation of background object 508 (e.g., tree) is reduced, and the expected printing time may shorten.

In some embodiments, control circuitry 304 may modify a parameter of design file for the 3D printing of a first background object (e.g, house 506) based on a determined attribute of a second background object 508 (e.g., tree). Control circuitry 304 may determine the attribute of the tree object 508 by analyzing metadata associated with media frame 514. For example, metadata associated with media frame 514 may contain an entry corresponding to the name of the second background object (e.g., tree 508), along with attributes such as width, height, and color of the second background object 508. Alternatively, control circuitry 304 may analyze the design file for the 3D printing of tree 506 to determine the attribute. For example, to determine the height attribute of the second background object 508, control circuitry 304 may analyze each parameter defining the surface area representation of object 508. In this case, control circuitry 304 may isolate those surface parameters which contribute to the height of the object 508, and may add the values of each isolated parameter to determine a total height attribute for second background object 506. In a different example, control circuitry 304 may determine that the height attribute of the tree object 508 is initially set to twenty units. Control circuitry 304 may then select a second background object 506 (e.g., house). For example, control circuitry 304 may determine a second background object by determining the largest background object in media frame 514. As an example of this approach, control circuitry 304 may calculate the volumes of all background objects present in media frame 514, and determine that house object 506 has the largest volume. Accordingly, control circuitry 304 may select house object 506 as the second background object. In another example, control circuitry 304 may use the user's profile to determine the type of objects most frequently printed by the user, and if present in the media frame 514, select such an object.

In some embodiments, control circuitry 304 may modify the parameter of the design file for the 3D printing of the background object based on the determined attribute of the second background object. For example, control circuitry 304 may determine that the height attribute of the second object (e.g., house 506) is twenty units. Control circuitry 304 may then modify the height attribute of the first background object (e.g., tree 508) by decreasing the height parameter of the first background object from eighty units to thirty units. As a result, when printed, no drastic height differences exist between the height of the first object (e.g., tree 508) and the height of the second object (e.g., house 506).

In some embodiments, control circuitry 304 may modify a parameter of the design file for the 3D printing of a background object based on a determined attribute of the foreground object 502. For example, if control circuitry 304 determines that the height attribute of a selected foreground object 502 (e.g., animated movie character) is eight units, and the height of the background object (e.g., tree 508) is eighty units, then control circuitry 304 may modify the height parameter of design file for the 3D printing of the tree object 508 to twelve units, which is a value that is more similar to the height of foreground object 502 (e.g., animated movie character).

In some embodiments, control circuitry 304 may source the design file for the 3D printing of the background object from CGI data associated with the media frame. For example, upon control circuitry 304 receiving a selection of a background object 508 (e.g., tree) from media frame 514, which may display an animated movie frame rendered using CGI data, control circuitry 304 may retrieve a CGI data design file used in rendering the media frame from media content source 416, using communication network 414.

In some embodiments, control circuitry 304 determines that CGI or similar data is unavailable for a particular media frame (e.g., media frame 514). In such circumstances, control circuitry 304 may determine whether the scene of media frame 514 was captured at the same instance from two or more cameras, and, if so, control circuitry 304 may determine and populate metadata based on features of the multiple frames. As an example, if media frame 514 is a frame of a sports game, control circuitry 304 may determine that multiple cameras captured the sports game. For example, multiple broadcast television cameras, in addition to multiple personal cameras (e.g., cameras on smart phones) may have captured the sports game. Control circuitry 304 may determine a frame from two or more of the multiple cameras that was captured at the same instant as media frame 514 was captured. Control circuitry 304 may then analyze the differing perspectives of each frame to determine attributes of media frame 514, such as relative distance of each object from each other object, or features of objects that are not indicated in media frame 514 (for example, if media frame 514 depicts the front of a person, the perspective of a different frame taken at the same instant may provide data on how the back of the person looks). Control circuitry 304 may then use this metadata to populate or supplement a design file for the 3D printing of the background object (e.g., background object 506). For example, upon receiving a selection of a background object 506, control circuitry 304 may transmit a request to media content source 416 to determine whether one or more additional media frames, associated with a particular time stamp and depicting background object 506, are available. Control circuitry 304 may then create a design file for the 3D printing of background object 506 by combining data from media frame 514 with data from a media frame received by control circuitry 304 from media content source 416. For example, if the user-selected media frame depicts the front of a baseball player standing in the background of a media frame, and a second media frame depicts the back of the same baseball player at the same moment in time (e.g, having the same associated time stamp), control circuitry 304 may analyze the two media frames and combine the characteristics of both media frames to create a design file for the 3D printing of a baseball player object.

Control circuitry may consider each additional media frame, in the manner described above, to determine apparent distances and sizes of each object of the frames (e.g., by triangulating each object), and may then create a design file for the 3D printing of a background object (e.g. chair 504) by combining data from the user-selected media frame and the considerations of the additional media frames.

In some embodiments, control circuitry 304 may select an object and detect that the object is subject to copyright restrictions. For example, the movie scene depicted in media frame 514 may include house object 506, the depiction of which is copyrighted, given its prominent role in a recent blockbuster film. Upon determining that an object (e.g., house 506) is copyrighted, control circuitry 304 may transmit a request to media content 416 requesting the retrieval of a design file for a non-copyrighted object with similar characteristics. In one example approach, if the depiction of house 506 is copyrighted, control circuitry 304 may read a metadata description of house 506, and determine that it has the characteristics of a house, that it has two windows, and that it is a single story building. Control circuitry 304 may then perform a keyword search on the metadata of design objects stored in media content source 416 to determine a non-copyrighted object that has the most similar metadata characteristics to the metadata characteristics of house 506. Control circuitry 304 may retrieve the design file of the non-copyrighted object, and may substitute the design file of the non-copyrighted object in place of the existing copyrighted background object 506. As a result, the user may avoid incurring additional costs when printing background object 506 by avoiding fees attendant to copyright royalties.

In a second example approach, if control circuitry 304 determines that the depiction of a background object is copyrighted, control circuitry 304 may read the metadata pricing information for the object and determine the price that is charged for the copyrighted object. For example, if the depiction of house object 506 is copyrighted, control circuitry 304 may analyze the metadata pricing information of house object 506, and determine that the user may be charged five dollars for using the design file for corresponding to house object 506. The metadata pricing information may include references to alternative designs which may present a lesser cost to the user. For example, control circuitry 304 may determine that the cost of using the design file corresponding to house object 506 is five dollars, and, additionally, it may determine that an alternative design file corresponding to house object 506, which, when 3D printed, lacks, for example, a characteristic coloring scheme that was an integral part of a recent blockbuster film, can be sourced from media content source 416 at a cost of two dollars. Control circuitry 304 may then present a first option of using the higher priced design file and a second option of using the lower priced design file to the user using with display 312. As another example, control circuitry 304 may also analyze the user profile to determine whether a user has saved a preference in the profile for selecting objects of different costs. For example, Tommy's parents may have set an option in Tommy's profile which indicates that the design file with the lowest price should always be used. In this case, control circuitry 304 may select the lower priced object automatically. When presenting an option for using a higher priced design file and a second design file of using a lower priced object, control circuitry 304 may then the user's input from user input interface 310, which may, for example, indicate a preference for the lower priced design file. Control circuitry 304 may then retrieve the lower priced design file for the object from media content source 416.

In another example of this approach, control circuitry 304 may determine that a more detailed design file of the background object may exist by analyzing metadata pricing information. For example, control circuitry 304 may determine that background object 506 as currently depicted in the media frame does not include any members of the animated movie character's family standing in front of it. However, control circuitry 304 may analyze the metadata associated with the house object 506 and discover that an alternative design file for house object 506 exists, in which the members of the animated movie character's family are pictured standing in front of house object 506. Control circuitry 304 may then present a first option of using the more detailed design file and a second option of using the original design file to the user using display 312. Control circuitry 304 may then receive the user's input, which may, for example, indicate a preference for the more detailed design file for the 3D printing of house object 506. Control circuitry 304 may then retrieve the more detailed design file for the house object 506.

In some embodiments, control circuitry 304 may generate a design file for the 3D printing of a base board object. The base board object may include a surface to which background objects may be attached to, so that the base board object and the background object are printed as one object. For example, control circuitry 304 may transmit a request to access a database of relevant base board objects (e.g., media content source 416). In one example, control circuitry 304 may analyze metadata location description associated with a media frame 514 (e.g., as retrieved from media content source 416) and determine that media frame 514 portrays the interior of a room. Control circuitry 304 may then use a look-up table to determine that a particular type of base board should be selected for a given metadata location description (e.g., a scene inside of a room). For example, the determined base board object may include a floor surface, and three wall surfaces placed perpendicularly to the floor in such a way that when printed and viewed from a particular angle, a wall may be seen directly opposite of the user, and perpendicular to the wall, a wall on each side is visible. In another example, if control circuitry 304 analyzes the metadata location description and determines that the location is an open field, control circuitry 304 may determine, by using a look-up table, that a flat base board object may be selected to reflect the location of media frame 514.

In another approach, control circuitry 304 may analyze the design files for a media frame 514, and generate a base board object that reflects detected surfaces of the media frame. For example, if media frame 514 depicts a hill standing in the middle of an open field, control circuitry 304 may analyze the parameters of the design file for the 3D printing of the ground surface object visible in media frame 514 and determine that a central part of the ground surface object is raised. Control circuitry 304 may then create a design file for a base board object that includes a flat rectangular surface which features a distended area in a middle of the rectangular surface. As a result, a representative depiction of the hill may be printed.

In some embodiments, control circuitry 304 may analyze multiple parameters of a background object that specify the design of each component of the object (e.g., the design of each branch of tree 508). Control circuitry 304 may then incorporate all of the parameters of the background object, or a subset of the parameters of the background object, into a design file for a base board object. For example, control circuitry 304 may determine that only those parameters of a background object 508 (e.g., tree), that when printed, are visible to a user when viewing the object from a specified reference point. Control circuitry 304 may add these parameters to the design file for a base board object. In one example, when control circuitry 304 determines that media frame 514 depicts an open field, control circuitry 304 may select a base board object, that, when printed, appears as a flat object. Control circuitry 304 may then add parameters of the design file of the background object 508 (e.g., a tree) to the design file of the base board object. As a result, when printed, the base board object may include the flat surface of the open field, as well as a background object 508 (e.g., tree).

In some embodiments, control circuitry 304 may modify the design file for the 3D printing of a base board object to harmonize the base board object with a printed foreground object (e.g., a 3D representation of foreground object 502) Control circuitry 304 may harmonize the base board object with the 3D representation of the foreground object by modifying a design file for the base board object in such a way that, when both objects are printed individually, a 3D representation of the foreground object may be placed on the base board object in a stable manner. For example, control circuitry 304 may analyze the design file for the 3D printing of the selected foreground object 502 (e.g., animated movie character) and determine that, in media frame 514, the foreground object 502 makes contact with a ground surface object at the base of the selected foreground object 502 (e.g., the animated movie character's shoe soles may make contact with the ground). In this example, control circuitry 304 may then analyze the parameters of the design file for the 3D printing of foreground object 502 (e.g., the shoes of the animated movie character) and determine a subset of parameters of the design file for the 3D printing of a 3D representation of foreground object 502 that modifies the parts of the surface of the foreground that make contact with the ground object. Based on this subset of parameters, control circuitry 304 may then modify the design file for the 3D printing of the base board object, which may include a parameters for printing a 3D representation of the ground object, in such a way that, when printed, the printed representation of the foreground object 502 may be coupled seamlessly with the printed representation of the base board object. As an additional example, control circuitry 304 may instead modify the design file for the 3D printing of a 3D representation of foreground object 502 in such a way that, when printed, the printed representation of foreground object 502 may be coupled seamlessly with the printed representation of the base board object.

As a final example, control circuitry 304 may modify both the design file for the 3D printing of the representation of foreground object 502 and the design file for the 3D printing of the base board object so that a printed representation of the foreground object 502 may be coupled seamlessly with the printed representation of the base board object. A seamless coupling may be achieved by the base of a printed 3D representation of foreground object 502 fitting into an indentation in the base board object in such a way that the foreground object remains static, even if the base board object is subject to physical movement by the user. In another example, a printed 3D representation of foreground object 502 may include a fitting panel element. The printed representation of a fitting panel element may be a hollow space with a circular opening. Control circuitry 304 may add parameters for the 3D printing of a fitting panel element to the design file for the 3D printing of the back board object. A printed representation of the foreground object may include a fitting cylinder element attached to the printed representation of the base of the printed representation of the foreground object. The printed representation of a fitting cylinder element may be a cylindrical 3D shape, which, upon insertion into the printed representation of the fitting panel element, may form a seamless coupling through the friction of the printed representation of the fitting cylinder element surface against the surface of the printed representation of the fitting panel element. As a final example, the design file for the 3D printing of a foreground object may include parameters for printing a cylindrical base 512, which, when printed, may attach to the bottom of the printed representation of foreground object 502. Control circuitry 304 may modify the design file for the 3D printing of the base board object to include a cylindrically-shaped indentation, into which a printed representation of foreground object 502 (e.g., animated movie character) with a printed representation of cylindrical base 512 may be inserted.

In some embodiments, control circuitry 304 may receive a user input corresponding to a parameter of the design file for the 3D printing of the background object. For example, control circuitry 304 may detect that a user used the touchscreen interface of user equipment 500 to select a background object 504. Control circuitry 304 may then detect a second user input at user input interface 310, which may control a parameter of the background object 504. For example, control circuitry 304 may determine that, based on the user input received at user input interface 310, the height parameter of design file for the 3D printing of the background object 504 may be increased.

In some embodiments, control circuitry 304 may analyze multiple parameters of the design file for the 3D printing of a background object, while concurrently analyzing multiple parameters of the design file for the printing of a second parameter object. In effect, control circuitry 304 may merge the design files for the 3D printing of a first and second background object into one design file based on this analysis, so that the printed representations of both objects are printed as a single printed object. In some examples, control circuitry 304 may select the first object based on a selection of the foreground object 502. Control circuitry 304 may determine that chair object 504 is the closest object to foreground object 502 in terms of visual distance. In a second example, control circuitry 304 may select a background object base on a user profile. The basis for this selection may be, for example, a determination by control circuitry 304 of which objects present in the media frame 514 are most relevant to a user based on a user profile. The user profile may include any or all of the 3D printing history, 3D printing preferences, demographic information, previously viewed media assets, and the like. For example, if control circuitry 304 determines that the user has previously printed furniture present in a media scene, control circuitry 304 may select chair object 504.

Control circuitry 304 may select a second background object based on the selection of the first background object. As a result, control circuitry 304 may merge the design files for the 3D printing of first and second background objects into one design file, so that the printed representations of both objects are printed as a single printed object. For example, control circuitry 304 may select a second background object based on the visual distance of a second background object to the first background object. For example, if control circuitry 304 selects tree object 508 as the first background object, control circuitry 304 may then determine the distance between tree object 508 and every other background object in media frame 514. In one example, control circuitry 304 may determine that house object 506 is the closest object to the first background object (e.g., tree 508), and select house object 506 as the second background object. In a final example, control circuitry 304 may select a second background object by determining the proximity of all background objects in media frame 514 to the background object. Control circuitry 304 may then determine the tallest background object which is within a specified distance from the first background object (e.g., tree 508). For example, control circuitry 304 may specify the distance as four measures of the maximum width of the first background object. In this example, control circuitry 304 may select tree object 510, as it is higher than house object 506.

In some embodiments, control circuitry 304, upon selecting a first background object (e.g., tree 508) and a second background object (e.g., tree 510), may analyze parameters of the design files for both the first and the second objects. For example, control circuitry 304 may merge the design files for the 3D printing of the two objects together into one file. In this case, control circuitry 304 may discard parameter information which may specify the design of a part of the first background object. As a result, when printed alone, the first background object may be printed with a straight surface perpendicular to a plane, indicating that the physical representation of the object outside of the surface has been discarded. For example, control circuitry 304 may modify the design file for the 3D printing of tree object 508 such that a printed representation of the tree object is printed with a part of the crown of the tree missing. Control circuitry 508 may then proceed to modify the parameters of the design file for the 3D printing of the second object 510, using the analyzed parameters of the first background object 508 so that, when printed independently, the second background object 510 may be printed with a straight surface perpendicular to a plane, indicating that the printed representation of the second background object 510 outside of the surface has been discarded. Control circuitry 304 may further modify the design file for the 3D printing of the second background object 510 in such a way that the printed representation of the first background object 508 merges into the printed representation of the second background object 510 at the two straight surfaces. For example, in the case that the first background object is tree object 508, and the second background object is tree object 510, control circuitry 304 may apply parameter modifications to the design files for the 3D printing of both tree object 508 and tree object 510 in the manner described above.

In some embodiments, control circuitry 304 may analyze multiple parameters of two background objects, and then generate a new design file for the printing of both objects based on the analyzed parameters. For example, in the case that the first background object is tree object 508, and the second background object is tree object 510, control circuitry 304 may apply parameter modifications to both tree object 508 and tree object 510 such that when control circuitry 304 aligns tree object 510 and tree object 508 on a horizontal plane, tree object 508 and tree object 510 appear as one object.

Figure 6:
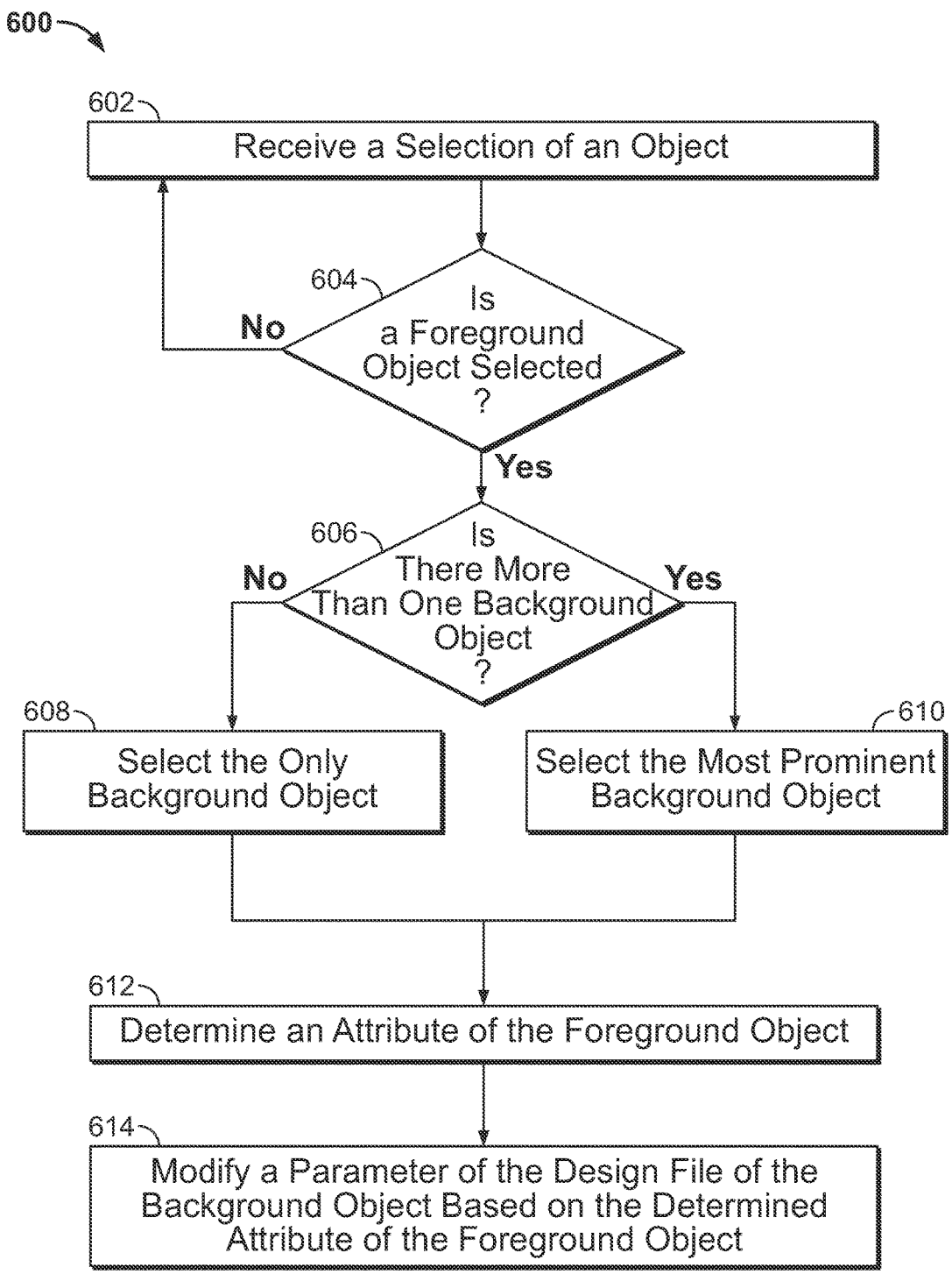
FIG. 6 is a flowchart of illustrative steps for modifying a parameter of a design file of a background object found in a media frame based on characteristics of another object in the media frame, in accordance with some embodiments of the disclosure.

FIG. 6 is a flowchart of illustrative steps involved in modifying a parameter of the design file of a background object found in a media frame, based on whether a foreground object 502 has been selected and whether there is more than one background object present in the media frame 514, in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by control circuitry implemented on user equipment 500, 404, and/or 406 (FIG. 4) in order to ascertain a background object of a media frame. In addition, one or more steps of process 600 may be incorporated into or combined with one or more steps of any other process or embodiment Process 600 begins at 602, where control circuitry 304 may receive a selection of an object 502 presented in media frame 514 from a user. Media frame 514 may be a still picture, or may be a frame of a video that is being viewed by a user. A video from which media frame 514 is derived may be, for example, broadcast television video, Internet video, on-demand video, or video from any other source. User equipment 500 is depicted as a tablet device (e.g., an iPad), but may be any user equipment device, including user television equipment 402, user computer equipment 404, or wireless user communications device 406. If control circuitry 304 does not detect a presence of an object 502, process 600 may end or start over. Control circuitry 304 may receive a selection of an object from the user through user interface 310. For example, in the case that user equipment 500 has the ability to receive touch screen input, control circuitry 304 may receive the selection by detecting that a user has touched the screen of user equipment 500 at a position where an object of media frame 514 is presented on the user equipment 500. For example, a user may touch user equipment 500 at a location where foreground object 502 is displayed in media frame 514. Once control circuitry 304 receives a selection of an object, process 600 may continue to 604.

At 604, control circuitry 304 determines whether a foreground object 502 has been selected. If control circuitry 304 does not detect a foreground object 502, process 600 may end or start over. As discussed above, control circuitry 304 may determine whether a foreground object 502 has been selected using metadata associated with the object. For example, control circuitry 304 may retrieve metadata from media guidance data source 418, and the metadata may be associated with a specific media name and time stamp combination. A media frame 514 at a given point in the playback of a video may include a foreground object placed in a specific area of media frame 514 (e.g., foreground object 502 standing at the right side of media frame 514). In this example, media frame 514 may be associated with a specific time stamp (e.g., twenty minutes and thirty one seconds from the start of video playback) and media name (such as a movie title like "Shrek"). Control circuitry 304 may acquire the media name information from media guidance source 418. Control circuitry 304 may send information naming the media and the determined time stamp (e.g., over communication network 414) to media guidance data source 418 to acquire metadata associated with media frame 514. For example, control circuitry 304 may determine that the retrieved metadata includes an entry for each object 502, 504, 506, 508, and 510 presented in media frame 514. Each such entry may identify the name of the object and whether the object is a foreground object or a background object. For example, after control circuitry 304 receives a selection of an object, control circuitry 304 may use the metadata to determine that the selected object (e.g., animated movie character 502) is a foreground object. If control circuitry 304 determines that a foreground object has been selected, process 600 may continue to 606.

At 606, control circuitry 304 may determine whether more than one background object is present in media frame 514. Control circuitry 304 may use metadata associated with the media frame to determine a number of background objects present in frame 514, as discussed above. If control circuitry 304 determines that there is only one background object present in media frame 514, process 600 may continue to 608. If, on the other hand, control circuitry 304 determines that multiple background objects are present in frame 514, process 600 may continue to 610. As described above, control circuitry 304 may use the metadata associated with media frame 514 to determine whether there are multiple background objects present in media frame 514.

At 608, control circuitry 304 may select the only background object present. For example, control circuitry 304 may select the chair object 504 if the chair object were the only background object displayed in media frame 514. As discussed above, control circuitry 304 may transmit a request using communications network 414 to retrieve a design file for the background object from media content source 416. Once control circuitry 608 selects the only background object present in media frame 514, process 600 may continue to 612.

At 610, control circuitry 304 may select the most prominent background object present. Control circuitry 304 may compare metadata describing background objects present in frame 514 and determine the most prominent object based, for example, on volume. As discussed above, control circuitry 304 may transmit a request using communications network 414 to retrieve a design file for the background object from media content source 416. It should be understood that any other example method of selecting objects, described above, may be used at 610. Once control circuitry 608 selects the most prominent object present in media frame 514, process 600 may continue to 612.

At 612, control circuitry 304 may determine an attribute of the foreground object. For example, control circuitry 304 may determine that the height attribute of the foreground object 502 is eight units. In another example, control circuitry 304 may determine the y coordinate of the position of the foreground object, where the y coordinate position reflects a determined distance of the foreground object from the bottom edge of the media frame 514. Control circuitry 304 may determine these attributes from metadata corresponding to media frame 514 (e.g., as retrieved from a database such as media guidance data source 418) for a given media frame 514. Control circuitry 304 may retrieve the metadata listing attributes using a combination of media name and time stamp to query for the relevant metadata, as described above. Once the control circuitry determines an attribute of the foreground object, process 600 may continue to 614.

At 614, control circuitry 304 may use the determined attribute of the foreground object to modify a parameter of the design file of the background object. For example, control circuitry 304 may modify a parameter of the design file for the 3D printing of a background object based on the determined attribute of the foreground object. For example, if control circuitry 304 determines that a height attribute of a selected foreground object 502 is eight units, and the height of the background object (e.g., tree 508) is eighty units, then control circuitry 304 may modify the height parameter of the tree to twelve units, which is a value that is more similar to the height of the foreground object 502. In doing so, control circuitry 304 may generate a design file that keeps each object of media frame 304 in similar proportion with respect to one another.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

FIG. 7 shows an illustrative embodiment of a 3D printed base board object with printed three-dimensional representations of objects resting on the base board in accordance with some embodiments of the disclosure. Base board 714 may be a base board printed using a design file corresponding to a base board. The design file used to print base board 714 may have been created or modified by control circuitry 304 in any manner described above and below. Control circuitry 304 may have specifically designed base board 714 to accommodate a three-dimensional representation of some or all of the objects depicted in media frame 514. For example, in the illustrative embodiment of FIG. 7, toy animated movie character 702 corresponds to foreground object 502, toy chair 704 corresponds to background object 504, toy house 706 corresponds to background object 506, and toy trees 708 and 710 correspond to background objects 508 and 510, respectively. A design file corresponding to base board 714 may be specifically designed to accommodate any or all of objects 702, 704, 706, 708, and 710. As an illustrative example, base board 714 may be designed to include indentation 712. Control circuitry 304 may have determined that a three-dimensional representation of any object, such as printed object 702, may have features at a connection point to a base board, and may have caused indentation 712 to exist in the base board to accommodate the connection point of printed object 702. As an example, indentation 712 may correspond to the shape of the feet of printed object 702. As another example, indentation 712 may be a cylindrical shape, where printed object 702 may have a cylindrical base that is accommodated by indentation 712. Control circuitry 304 may have additionally or alternatively considered the converse, where the design file corresponding to printed object 702 is altered by control circuitry 304 to include shoes or a cylindrical base that accommodates the shape of indentation 712. While indentation 712 is only depicted in connection with printed object 702, this is for illustrative purposes only, and indentation 712 may occur to accommodate none, some, or all of the objects resting on base board 714.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enabling three-dimensional printing of a selected foreground object and a background object presented within a media frame, the method comprising:
   receiving a selection of a foreground object of a media frame;
   ascertaining a background object of the media frame;
   determining a first height attribute associated with the foreground object and a second height attribute associated with the background object; and
   in response to determining that the second height attribute is larger than the first height attribute:
      modifying a first height parameter of a design file for three-dimensional printing of the background object to be equal to a second height parameter associated with the foreground object; and
      transmitting, to a three-dimensional printer, the design file to print a representation of the background object.

2. The method of claim 1, wherein modifying the first height parameter further comprises:
   determining a physical dimension constraint of a build volume of a three-dimensional printer;
   determining a maximum parameter value based on the determined physical dimension constraint, such that the background object is printed without cropping;
   comparing an existing value of the first height parameter to the maximum parameter value;
   determining whether the existing value of the first height parameter exceeds the maximum parameter value based on the comparison; and
   in response to determining that the existing value of the first height parameter exceeds the maximum parameter value, modifying the existing value of the first height parameter.

3. The method of claim 1, wherein modifying the first height parameter further comprises:
   determining that an expected time required for printing of the background object exceeds a specified threshold;
   in response to determining that the expected time required for printing the background object exceeds the specified threshold, modifying at least one of a focus parameter and a resolution parameter of the design file of the background object, wherein modifying the focus parameter reduces a level of complexity of the background object, and wherein modifying the resolution parameter decreases a number of printer movements necessary for the three-dimensional printing of the background object.

4. The method of claim 1, wherein modifying the first height parameter further comprises:
   determining an attribute of a second background object;
   in response to determining the attribute of the second background object, modifying the first height parameter of a design file for the three-dimensional printing of the background object based on the determined attribute of the second background object.

5. The method of claim 1, wherein modifying the first height parameter further comprises:
   analyzing a plurality of parameters of the design file of the background object, wherein the first height parameter of the design file of the background object is a parameter of the plurality of parameters of the design file;
   generating a design file for three-dimensional printing of a base board, wherein the design file for three-dimensional printing of the base board includes at least one parameter of the plurality of parameters of the design file of the background object, wherein the design file for three-dimensional printing of the base board is harmonized with a design file of the foreground object such that, upon three-dimensional printing of both the base board and a representation of the foreground object, the foreground object may be seamlessly coupled with the base board.

6. The method of claim 1, wherein determining the first height attribute associated with the foreground object further comprises:
   transmitting a request to a database that contains a plurality of parameters associated with the foreground object;
   receiving the plurality of parameters associated with the foreground object from the database; and
   from the plurality of parameters associated with the foreground object, identifying at least one of a size parameter and a position parameter associated with the foreground object.

7. The method of claim 1, wherein modifying the first height parameter further comprises:
   receiving a user input corresponding to the first height parameter of the design file for the three-dimensional printing of the background object;
   in response to receiving the user input, modifying the first height parameter such that a characteristic of a background object printed from the design file for the three-dimensional printing of the background object reflects the user input corresponding to the first height parameter.

8. The method of claim 1, further comprising:

analyzing a plurality of parameters of the design file for three-dimensional printing of the background object and analyzing a plurality of parameters for a design file for three-dimensional printing of a second background object; and generating a new design file based on the analyzed parameters such that when the design file is printed, the first ascertained background object and the second ascertained background object are printed as a single object.

9. The method of claim 1, wherein the media frame is selected by receiving a user input corresponding to the media frame.

* * * * *